US010225039B2

(12) United States Patent
Tollefson et al.

(10) Patent No.: US 10,225,039 B2
(45) Date of Patent: Mar. 5, 2019

(54) PHYSICAL LAYER ENCRYPTION USING OUT-PHASED ARRAY LINEARIZED SIGNALING

(71) Applicant: Massachusetts Institute of Technology, Cambridge, MA (US)

(72) Inventors: Eric R. Tollefson, Medford, MA (US); Bruce R. Jordan, Jr., Lincoln, MA (US)

(73) Assignee: Massachusetts Institute of Technology, Cambridge (*) Notice: Subject to any disclaimer, the term of this patent is extended or adjusted under 35 U.S.C. 154(b) by 225 days.

(21) Appl. No.: 15/304,141

(22) PCT Filed: May 11, 2015

(86) PCT No.: PCT/US2015/030085
§ 371 (c)(1),
(2) Date: Oct. 14, 2016

(87) PCT Pub. No.: WO2015/175374
PCT Pub. Date: Nov. 19, 2015

(65) Prior Publication Data

US 2017/0026146 A1 Jan. 26, 2017

Related U.S. Application Data

(60) Provisional application No. 61/991,824, filed on May 12, 2014, provisional application No. 61/992,354, filed on May 13, 2014.

(51) Int. Cl.
*H04L 9/06* (2006.01)
*H04K 1/02* (2006.01)
(Continued)

(52) U.S. Cl.
CPC ................ *H04K 1/02* (2013.01); *H04K 1/10* (2013.01); *H04K 3/825* (2013.01); *H04K 2203/32* (2013.01)

(58) Field of Classification Search
CPC .......... H04L 2209/04; H04L 9/06; H04N 5/91
See application file for complete search history.

(56) References Cited

U.S. PATENT DOCUMENTS 4,949,289 A 8/1990 Stephens et al.
6,311,046 B1 10/2001 Dent
(Continued)

OTHER PUBLICATIONS

Cepheli, et al.; "Efficient PHY Layer Security in MIMO-OFDM: Spatiotemporal Selective Artificial Noise"; 2013 IEEE 14th International Symposium and Workshops on a World of Wireless, Mobile and Multimedia Networks (WoWMoM); Jun. 4-7, 2013; pp. 1-6; 6 pages.
(Continued)

*Primary Examiner* — Izunna Okeke
(74) *Attorney, Agent, or Firm* — Daly, Crowley, Mofford & Durkee, LLP

(57) ABSTRACT

Systems and techniques for physical layer encryption (PLE) using beamforming. The techniques are based on the principles of Linear Amplification with Nonlinear Components (LINC) to produce a transmit signal with limited dynamic range. A masking signal is structured based upon a source data signal to produce a transmit signal with limited dynamic range, while providing a high degree of secrecy.

31 Claims, 6 Drawing Sheets

(51) Int. Cl.
*H04K 1/10* (2006.01)
*H04K 3/00* (2006.01)

(56) References Cited

U.S. PATENT DOCUMENTS

| | | | | |
|---|---|---|---|---|
| 7,664,274 | B1 * | 2/2010 | Graumann | H04H 20/31 380/238 |
| 7,957,712 | B2 | 6/2011 | Sjoland | |
| 2003/0091184 | A1 | 5/2003 | Chui | |
| 2006/0153375 | A1 | 7/2006 | Yi | |
| 2011/0246854 | A1 | 10/2011 | McLaughlin et al. | |

OTHER PUBLICATIONS

Chorti, et al.; "On the Resilience of Wireless Multiuser Networks to Passive and Active Eavesdroppers"; IEEE Journal on Selected Areas in Communication; vol. 31; No. 9; Sep. 2013; 14 pages.
Hokai, et al.; "Wireless Steganography using MIMO System"; 2014 IEEE Fifth International Conference on Communications and Electronics (ICCE); Jul. 30-Aug. 1, 2014; 6 Pages.
Hong, et al.; "Design of Directional Modulation Signal Based on Multi-objective Genetic Algorithm for Physical Layer Secure Communication"; Abstract Only; 2014 Journal Home; vol. 32; Issue (1); Dec. 12, 2011; 1 Page.
Hong, et al.; "Directional spread-spectrum modulation signal for physical layer security communication applications"; Security and Communication Networks; May 10, 2012; 12 Pages.
Hong, et al.; "Dual-Beam Directional Modulation Technique for Physical-Layer Secure Communication"; IEEE Antennas and Wireless Propagation Letters; vol. 10; Dec. 7, 2011; 4 Pages.
Li, et al.; "Artificial Noise Assisted Communication in the Multiuser Downlink: Optimal Power Allocation"; IEEE Communications Letters; vol. 19; No. 2; Feb. 2015; 4 Pages.
Li, et al.; Robust Cooperative Beamforming and Artificial Noise Design for Physical-Layer Secrecy in AF Multi-Antenna Multi-Relay Networks; IEEE Transactions on Signal Processing; vol. 63, No. 1, Jan. 1, 2015; 15 Pages.
Li, et al.; "Achieving Secure Transmission with Equivalent Multiplicative Noise in MISO Wiretap Channels"; IEEE Communications Letters; vol. 17; No. 5; May 2013; 4 Pages.
Lu; "An SLNR-based precoding scheme for secure downlink multigroup multicast MIMO systems"; Abstract Only; Jan. 2012; 1 Page.
Schaefer, et al.; "Physical Layer Service Integration in Wireless Networks"; IEEE Signal Processing Magazine; vol. 31; Issue 3; Apr. 7, 2014; pp. 147-156; 10 Pages.
Shi, et al.; "Secure Physical-Layer Communication Based on Directly Modulated Antenna Arrays"; Antennas and Propagation Conference (LAPC), 2012 Loughborough; Nov. 12-13; 4 Pages.
Song, et al.; "A Cooperative Jamming Based Security Algorithm for Multi-User MIMO Systems"; 2013 International Conference on Information Science Technology (ICIST); Mar. 23-25, 2013; 4 Pages.
Van Nguyen, et al.; "Secure multiple-input single-output communication—Part I: secrecy rates and switched power allocation"; IET Communications; vol. 8; Issue 8; Jun. 12, 2014; pp. 1217-1226; 10 Pages.
Wang, et al.; "Enhancing Physical Layer Security Through Beamforming and Noise Injection;" 2014 Sixth International Conference on Wireless Communications and Signal Processing (WCSP); Oct. 23-25, 2014; 6 pages.
Xiong, et al.; "Achieving Secrecy Capacity of MISO Fading Wiretap Channels with Artificial Noise"; 2013 IEEE Wireless Communications and Networking Conference (WCNC); Apr. 7-10, 2013; 5 pages.
Yamaguchi, et al.; "Physical Layer Network Coding with Multiple Untrusted Relays for Physical Layer Security"; 2014 Annual Summit and Conference Asia-Pacific Signal and Information Processing Association; Dec. 9-12; 5 Pages.
Yao, et al.; "A QPSK Modulation Scheme Based on Four Dimensional Antenna Arrays"; 2012 IEEE International Workshop on Electromagnetics; Applications and Student Innovation (iWEM) Aug. 6-9, 2012; 2 Pages.
Yang, et al.; "Achievable rate region with secrecy constraints for secure communication in two-way relay networks"; IEEE Transactions on Vehicular Technology; vol. 65; Issue 8; Sep. 19, 2013; 19 pages.
Zhao, et al.; "A Secure Method of Physical Layer Transmission Based on Multi-beam and Artificial Noise"; Abstract Only; Dianxun Jishu/Telecommunications Engineering; 51(7); Jan. 2011; pp. 30-33; 1 Page.
Zhu, et al.; "Relay Precoding in Multiuser MIMO Channels for Physical Layer Security"; 2014 IEEE/CIC International Conference on Communications in China (ICCC); Oct. 13-15, 2014; 5 Pages.
PCT International Preliminary Report dated Nov. 24, 2016 corresponding to International Application No. PCT/US2015/030085; 9 Pages.
Air Force Research Laboratory; Information Transmission; Security Classification Guide; May 31, 1997; 24 pages.
Abdelaal; "LINC Based Amplifier Architecture for Power Efficient Wireless Transmitters"—Abstract Only; Ecole Polytechnique; 2 pages; 2009.
Alrabadi, et al.; "Directional Space-Time Modulation: A Novel Approach for Secured Wireless Communication;" IEEE ICC Jun. 10-15, 2012; Signal Processing for Communication Symposium; pp. 3554-3558; 5 pages.
Bateman, et al.; "Implementation of the LINC Transmitter Using the Combined Analogue Locked Loop Universal Modulator (CALLUM);" Mobile and Personal Communications; Conference Publication No. 387; Dec. 13-15, 1923; pp. 31-37; 7 pages.
Bateman; "The Combined Analogue Locked Loop Universal Modulator (CALLUM);" IEEE 42$^{nd}$ Vehicular Technology Conference Center; May 10-13, 1992; pp. 759-763; 5 pages.
Birafane, et al.; "Analyzing LINC System;" IEEE Microwave Magazine; Aug. 2010; pp. 59-71; 13 pages.
Cepheli, et al.; "Analysis on the Effects of Artificial Noise on Physical Layer Security;" 21$^{st}$ Signal Processing and Communications Applications Conference; Apr. 24-26, 2013; 4 pages.
Chae, et al.; "Enhanced Secrecy in Stochastic Wireless Networks: Artificial Noise With Secrecy Protected Zone;" IEEE Transactions on Information Forensics and Security; Vo. 9; No. 10; Oct. 2014, pp. 1617-1628; 12 pages.
Chiw, et al.; "Compact Power Combining Patch Antenna;" Electronics Letter; Nov. 7, 2002; vol. 38; No. 23; pp. 1413-1414; 2 pages.
Chiw, et al.; "Stacked Common Mode Power Combining Patch Antenna for LINC Transmitter;" 33$^{rd}$ European Microwave Conference; Oct. 2-10, 2003; pp. 691-694; 4 pages.
Choffrut, et al.; "Traveling Wave Tube-Based LINC Transmitters;" IEEE Transactions on Electron Devices; vol. 50; No. 5; May 2003; pp. 1405-1407; 3 pages.
Chowdhury, et al.; "A New Symmetric Key Encryption Algorithm based on 2-d Geometry;" 2009 International Conference on Electronic Computer Technology; IEEE Computer Society; Feb. 27, 2009; pp. 541-544; 4 pages.
Cox; "Linear Amplification with Nonlinear Components;" IEEE Transactions on Communications; Dec. 1974; pp. 1942-1945; 4 pages.
Daly, et al.; "Directional Modulation and Coding in Arrays;" Antennas and Propagation (APSURSI); 2011 IEEE International Symposium; Jul. 3-8, 2011; pp. 1984-1987; 4 pages.
Daly; "Physical Layer Encryption Using Fixed and Reconfigurable Antennas;" Dissertation; 2012; 119 pages.
Ding, et al.; "A Vector Approach for the Analysis and Synthesis of Directional and Modulation Transmitters;" IEEE Transactions on Antennas and Propagation; vol. 62; Issue 1; Jan. 2014; 11 pages.
Ding, et al.; "Directional Modulation Transmitter Synthesis using Particle Swarm Optimization;" Antennas and Propagation Conference (LAPC); Nov. 11-12, 2013; pp. 500-503; 4 pages.

(56) References Cited

OTHER PUBLICATIONS

Ding, et al.; "Establishing Metrics for Assessing the Performance of Directional Modulation Systems;" Queen's University Belfast—Research Portal; IEEE Transactions on Antennas and Propagation; vol. 62; Issue 5; May 2015; 12 pages.
Ding, et al.; "Improved Physical Layer Secure Wireless Communications Using a Directional Modulation Enhanced Retrodirective Array;" General Assembly and Scientific Symposium (URSI GASS); Oct. 20, 2014; 4 pages.
Ding, et al.; "Orthogonal Vector Approach for Synthesis of Multi-Beam Directional Modulation Transmitters;" Queen's University Belfast—Research Portal; vol. 14; Feb. 19, 2015; 5 pages.
Ding, et al.; "Polarization Distortion as a Means for Securing Wireless Communication;" The 8$^{th}$ European Conference on Antennas and Propagation; Apr. 6-11, 2014; pp. 1454-1458; 5 pages.
Elaal, et al.; "ACPR Performance Study for Modified LINC Amplifier;" 13$^{th}$ IEEE International Conference on Electronics, Circuits and Systems; Dec. 10-13, 2006; pp. 435-438; 4 pages.
Gao, et al.; "Slot-Coupled Integrated Antenna for LINC Transmitters;" 12$^{th}$ International Conference on Antennas and Propagation; Mar. 31-Apr. 3, 2003; pp. 241-244; 4 pages.
Garcia, et al,; "Nonlinear Distortion Cancellation Using LINC Transmitters in OFDM Systems;" IEEE Transactions on Broadcasting; vol. 51, No. 1; Mar. 2005; pp. 84-93; 10 pages.
Goel, et al.; "Guaranteeing Secrecy Using Artificial Noise;" IEEE Transactions on Wireless Communications; vol. 7; No. 6; Jun. 2008; pp. 2180-2189; 10 pages.
Goel, et al.; "Secret Communication in Presence of Colluding Eavesdroppers;" MILCOM2005; IEEE Military Communications Conference; Oct. 17-20, 2005; 6 pages.
Hegazi, et al.; "Improved LINC Power Transmission Using a Quadrature Outphasing Technique;" MTT-S International Microwave Symposium Digest; Jun. 17, 2005; pp. 1923-1926; 4 pages.
Hegazi, et al.; "Linear Wideband VHF/UHF Quad LINC Transmitter System;" MILCOM 2007; IEEE Military Communications Conference; Oct. 29-31, 2007; pp. 1-6; 6 pages.
Hong, et al.; Directional Sensitive Modulation Signal Transmitted by Monopulse Cassegrain Antenna for Physical Layer Secure Communication; Progress in Electromagnetics Research M; vol. 17; Jan. 2011; pp. 167-181; 15 pages.
Hong, et al.; "RF Directional Modulation Technique Using a Switched Antenna Array for Physical Layer Secure Communication Applications;" Progress in Electromagnetics Research; vol. 116; Mar. 2011; pp. 363-379; 17 pages.
Hur, et al.; "Highly Efficient Uneven Multi-Level LINC Transmitter;" Electronics Letters; Jul. 30, 2009; vol. 45; No. 16; pp. 837-838; 2 pages.
Li, et al.; "Optimal and Robust Transmit Designs for MISO Channel Secrecy by Semidefinite Programming;" IEEE Transactions on Signal Processing; vol. 59; Issue 8; Dec. 20, 2010; 31 pages.
Li, et al.; "Spatially Selective Artificial-Noise Aided Transmit Optimization for MISO Multi-Eves Secrecy Rate Maximization;" IEEE Transactions on Signal Processing; vol. 61; Issue 10; Mar. 2013; 30 pages.
Liang, et al.; "Transmitter Linearization by Beamforming;" IEEE Journal of Solid-State Circuits; vol. 46; No. 9; Sep. 2011; pp. 1956-1969; 14 pages.
Liang; "Transmitter Linearization by Beamforming;" Thesis; University of California; 2009; 128 pages.
Liang; "Transmitter Linearization by Beamforming;" Abstract Only; University of California; 2009; 2 pages.
Liao, et al.; "Qos-Based Transmit Beamforming in the Presence of Eavesdroppers: An Optimized Artificial-Noise-Aided Approach;" IEEE Transactions on Signal Processing; vol. 59, No. 3; Mar. 2011; 15 pages.
Liefer; "Signal Processing Design of Low Probability of Intercept Waveforms Via Intersymbol Dither;" Thesis; Department of the Air Force; Air Force Institute of Technology; Mar. 2008; 107 pages.
Lim, et al.; "Compensation of Path Imbalance in LINC Transmitters Using EVM and ACPR Look Up Tables;" Proceedings of Asia-Pacific Microwave Conference 2010; Microwave Conference Proceedings (APMC); Dec. 7-10, 2010; pp. 1296-1299; 4 pages.
Ma, et al.; "A New Approach to Null Space-Based Noise Signal Generation for Secure Wireless Communications in Transmit-Receive Diversity Systems;" 2010 IEEE International Conference on Wireless communications, Networking and Information Security (WSCNIS); Jun. 25-27, 2010; pp. 406-410; 5 pages.
Mukherjee, et al.; "Principles of Physical Layer Security in Multiuser Wireless Networks; A Survey;" IEEE Communications Surveys & Tutorials; vol. 16; Issue 3; Feb. 13, 2014; 23 pages.
Mukherjee, et al.; "Robust Beamforming for Security in MIMO Wiretap Channels with Imperfect CSI;" IEEE Transactions on Signal Processing; vol. 59; Sep. 20, 2010; Issue 1; 10 pages.
Mustafa, et al.; "Bandwidth Limitation for the Constant Envelope Components of an OFDM Signal in a LINC Architecture;" IEEE Transactions on Circuits and Systems—1: Regular Papers; IEEE Transactions on Circuits and Systems; vol. 60; Issue 9; Feb. 20, 2013; 9 pages.
Newman; "Chapter VII—Receiver Optimization Using Error Vector Magnitude Analysis;" Analog Devices; ADI Wireless Seminar 2006; pp. VII-1-VIII-5; 5 pages.
Ohno, et al.; "Optimization of Transmit Signals to Interfere Eavesdropping in a Wireless Lan;" 2014 IEEE International Conference on Acoustic, Speech and Signal Processing (ICASSP); May 4-9, 2014; pp. 6093-6097; 5 pages.
Papadias, "Globally Convergent Blind Source Separation Based on a Multiuser Kurtosis Maximization Criterion"; IEEE Transactions on Signal Processing, vol. 48. No. 12.; Dec. 2000; pp. 3508-3519; 12 pages.
Pearson, et al.; "Software Radio Performance Improvement through Combined RF and Digital Design;" IEEE Radio and Wireless Symposium; Jan. 22-24, 2008; pp. 291-294; 4 pages.
Pellegrini, et al,; "Cryptographically Secure Radios Based on Directional Modulation;" IEEE Conference on Acoustics, Speech and Signal Processing (ICASSP); May 4-9, 2014; 5 pages.
Shannon, "Communication Theory of Secrecy Systems;" The Bell System Technical Journal; vol. 28, Issue 4; Oct. 1949; pp. 656-715; 60 pages.
Simoneau et al,; "Digital Augmentation of RF Component Performance in Software-Defined Radio;" IEEE Transactions on Microwave Theory and Techniques; vol. 57, No. 3.; Mar. 2009; p. 573-581; 9 pages.
Strandberg, "CALLUM Linear Transmitter;" Architecture and Circuit Analysis; Department of Electroscience; Lund University; Jan. 1, 2004; 262 pages.
Tippenhauer, et al.; "On Limitations of Friendly Jamming for Confidentiality;" 2013 IEEE Symposium on Security and Privacy; May 19-22, 2013; pp. 160-173; 14 pages.
Wang, et al.; "Secure MISO Wiretap Channels with Multi-Antenna Passive Eavesdropper via Artificial Fast Fading;" IEEE International Conference on Communications; Jun. 10-14, 2014; 6 pages.
Wyner; "The Wire-Tap Channel;" The Bell System Technical Journal; vol. 54, No. 8; Oct. 1975; 34 pages.
Yang, et al,; "Algorithms for Secrecy Guarantee With Null Space Beamforming in Two-Way Relay Networks;" IEEE Transactions on Signal Processing, vol. 62, No. 8; Apr. 15, 2014; pp. 2111-2126; 16 pages.
Zhang,; "An Improved Outphasing Power Amplifier System for Wireless Communications;" University of California; Dissertation in Electrical Engineering; 2001; 218 pages.
Zhang, et al,; "A Secure MQAM Scheme Based on Signal Constellation Hopping;" KSII Transactions on Internet and Information Systems; vol. 8, No. 7; Jul. 2014; p. 2246-2260; 15 pages.
Zhang, et al.; "Collaborative Relay Beamforming for Secrecy;" IEEE International Conference on Communications (ICC); May 23-27, 2010; 5 pages.
Zhang, et al.; "Sidelobe Modulation Scrambling Transmitter Using Fourier Rotman Lens;" IEEE Transactions on Antennas and Propagation; vol. 61; Issue 7; Jul. 2013; pp. 3900-3904; 5 pages.

(56) References Cited

OTHER PUBLICATIONS

Zhou, et al.; "Physical Layer Security with Artificial Noise: Secrecy Capacity and Optimal Power Allocation;" 3rd International Conference on Signal Processing and Communication System; Sep. 28-30, 2009; 5 pages.
Zhu, et al.; "Secrecy Transmission Capacity in Noisy Wireless Ad Hoc Networks;" Journal—Ad Hoc Networks; Jan. 24, 2014; p. 26.
Zhu, et al.; "Secure Transmission in Multi-Cell Massive MIMO Systems;" IEEE Globecom Workshops; May 28, 2014, 2013; 33 pages.
Zou, et al.; "Improving Physical-Layer Security in Wireless Communications Using Diversity Techniques;" IEEE Network; vol. 29, Issue 1; May 16, 2014; 17 pages.
PCT International Search Report of the ISA for PCT/US2015/030085 dated Aug. 5, 2015; 4 pages.
PCT Written Opinion of the ISA for PCT/US2015/030085 dated Aug. 5, 2015; 8 pages.

* cited by examiner

PHYSICAL LAYER ENCRYPTION USING OUT-PHASED ARRAY LINEARIZED SIGNALING

CROSS REFERENCE TO RELATED APPLICATIONS

This application is a U.S. National Stage of PCT application PCT/US2015/030085 filed in the English language on May 11, 2015, and entitled "PHYSICAL LAYER ENCRYPTION USING OUT-PHASED ARRAY LINEARIZED SIGNALING," Which claims the benefit under 35 U.S.C. § 119 of provisional application No. 61/991,824 filed May 12, 2014, and provisional application No. 61/992,354 filed May 13, 2014, both of which applications are hereby incorporated be reference herein in their entireties.

STATEMENT REGARDING FEDERALLY SPONSORED RESEARCH

This invention was made with Government support under Contract No. FA8721-05-C-0002 awarded by U.S. Air Force. The Government has certain rights in the invention.

BACKGROUND

As is known in the art, physical layer encryption (PLE) is a set of techniques that rely on information theory and the concept of channel capacity for security. Unlike traditional encryption, such as private- and public-key systems, PLE is not vulnerable to computational attacks and can offer perfect forward security. Many PLE techniques work by artificially degrading the eavesdropper's channel so that their channel capacity is not sufficient to recover the infonnation being sent. For example, a masking signal may be added to a communication signal such that it has a null in the direction of an intended receiver. For all other directions spatially separated from the intended receiver, an eavesdropper will receive a combination of the communication and masking signals, with the masking signal dominant. This degrades the information capacity of the eavesdropper channel, making it difficult or impossible to recover the transmitted information.

PLE is generally quantified by a measure called secrecy capacity. This represents the difference in channel capacity between the intended receiver and the eavesdropper. A positive secrecy capacity means that the intended receiver has a higher capacity than the eavesdropper and the communication link can be configured so that the receiver can demodulate the data and the eavesdropper cannot by choosing an appropriate rate and encoding scheme. If the secrecy capacity is negative, then the eavesdropper will be able to demodulate any message that the intended receiver can and secrecy fails.

One example a PLE technique is called Additive Artificial Noise (AAN) in which a transmitted signal is expressed as:

$$\bar{x}_{AAN}(t)=\bar{w}\cdot s(t)+\bar{z}(t)\cdot n(t) \quad (1)$$

$$\bar{z}(t)\in N(\bar{h}),\|\bar{z}(t)\|=1 \quad (2)$$

where $\bar{z}(t)$ is a basis vector in the null space of the complex channel vector, vector $\bar{h}$, s(t) is the communication signal, $\bar{w}$ is the set of complex beam-forming weights, and n(t) is a Gaussian random variable with variance selected according to the desired power division between signal and artificial noise. The choice of a basis vector in the null space of the channel ensures that the artificial noise does not appear in the intended receiver.

Another family of techniques is called Directional Modulation (DM), in which a different weighting vector is chosen for each symbol in the transmit constellation in order to form the desired vector at the intended receiver. This causes receivers in other positions to receive a constellation with distorted but still distinct symbols. Determining the necessary weighting vector is an unbounded problem and generally requires the use of matrix inversion or optimization techniques. An improvement on this technique chooses a different weighting vector each time a given symbol appears. This is sometimes called Dynamic DM. This addresses the vulnerability of so-called Static DM systems to eavesdropping techniques which can resolve the distorted constellation by changing the pattern of distortion continuously.

SUMMARY

It has been appreciated herein that existing physical layer encryption (PLE) techniques, such as Additive Artificial Noise (AAN) and Directional Modulation (DM), do not provide a sufficiently high degree of secrecy, are difficult to implement, and/or are computationally expensive.

Disclosed herein are concepts, structures, and techniques to provide a high degree of secrecy while being relatively easy to implement in a practical system. The disclosure provides an implementation of PLE using a transmit antenna array and a novel beamforming scheme. The techniques are based on the principles of Linear Amplification with Nonlinear Components (LINC), are computationally simple relative to existing PLE techniques, and provide secrecy comparable to noise-based masking and produces a signal with limited dynamic range.

According to one aspect of the disclosure, a method for generating an physical layer encrypted communication, comprises: receiving a modulated data signal; generating a structured masking signal based upon the modulated data signal; selecting a plurality of mask coefficients, each of the plurality of mask coefficients selected from a set of possible mask coefficients; applying the mask coefficients to the structured masking signal to generate a plurality of masking signals; combining the modulated data signal with the plurality of masking signals to generate a plurality of masked data signals; and applying at least one of a weighting signal and a phasing signal to each of the plurality of masked data signals to generate a plurality of transmit signals, the transmit signals having a null in a predetermined direction.

In some embodiments, the method further comprises applying noise to the modulated data signal to increase a bit error rate (BER) associated with the transmit signals.

In certain embodiments, generating a structured masking signal based upon the modulated data signal comprises selecting a point on a circle having predetermined radius based upon the data signal. The method may further comprise receiving a mask power level ($R_{max}$), wherein the radius of the circle is determined based upon the mask power level. Generating a structured masking signal based upon the modulated data signal (a[k]) may comprise computing $$j\sqrt{\frac{R_{max}^2}{\|a[k]\|^2}-1}.$$

To improve efficiency, the method can include generating a table of solutions to $$j\sqrt{\frac{R_{max}^2}{\|a[k]\|^2}-1}$$

for various values a[k], wherein generating a structured masking signal based upon the modulated data signal comprises selecting a value from the table of solutions.

In various embodiments, selecting a plurality of mask coefficients comprises selecting a plurality of random numbers. In some embodiments, selecting a plurality of mask coefficients comprises selecting a plurality of mask that sum to zero. In certain embodiments, the method further comprises generating a plurality of possible mask coefficient vectors, wherein selecting a plurality of mask coefficients comprises randomly selecting a mask effective vector from the plurality of possible mask coefficient vectors. In some embodiments, applying the mask coefficients to the structured masking signal to generate a plurality of masking signals comprises modulating the structured masking signal by ones of the plurality of mask coefficients. In various embodiments, combining the modulated data signal with the plurality of masking signals to generate a plurality of masked data signals comprises summing the modulated data signal with ones of the plurality of masking signals.

In certain embodiments, the method further comprises transmitting each of the transmit signals via a respective transmit antenna, which may include transmitting via a phased array.

According to another aspect of the disclosure, a system for physical layer encrypted communication, comprises a data source, a plurality of transmit antennas, and a processor coupled to the input source and the transmit antennas. The processor may be configured to: receive a modulated data signal from the data source; generate a structured masking signal based upon the modulated data signal; select a plurality of mask coefficients, each of the plurality of mask coefficients selected from a set of possible mask coefficients; apply the mask coefficients to the structured masking signal to generate a plurality of masking signals; combine the modulated data signal with the masking signals to generate a plurality of masked data signals; apply at least one of a weighting signal and a phasing signal to each of the plurality of masked data signals to generate a plurality of transmit signals, the plurality transmit signals having a null in a predetermined direction; and transmit each of the plurality of transmit signals via a corresponding one of the plurality of transmit antennas.

In some embodiments, the processor is further configured to apply noise to the modulated data signal to increase a bit error rate (BER) associated with the transmit signals. In various embodiments, the processor is configured to generate a structured masking signal by selecting a point on a circle having predetermined radius. In certain embodiments, the processor is configured to select a plurality of mask coefficients that sum to zero. In some embodiments, the transmit antennas are provided within a phased array.

According to another aspect of the disclosure, a system for physical layer encrypted communication comprises: a data source to generate a modulated data signal; a mask generator coupled to receive the data signal and configured to generate a structured masking signal based upon the modulated data signal; a mask coefficient generator coupled to receive the structured masking signal and configured to multiple the structured masking signal by each of a plurality of mask coefficients to generate a plurality of masking signals, each of the plurality of mask coefficients selected from a set of possible mask coefficients; a combiner coupled to combine the modulated data signal with each of the plurality of masking signals to generate a plurality of masked data signals; a pulse-shaping module coupled to receive the plurality of masked data signals and configured to apply at least one of a weighting signal and a phasing signal to each of the plurality of masked data signals to generate a plurality of transmit signals, the transmit signals having a null in a predetermined direction; and a plurality of transmit antennas, each of the plurality of transmit antennas coupled to transmit a correspond one of the plurality of transmit signals.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Figure 1:
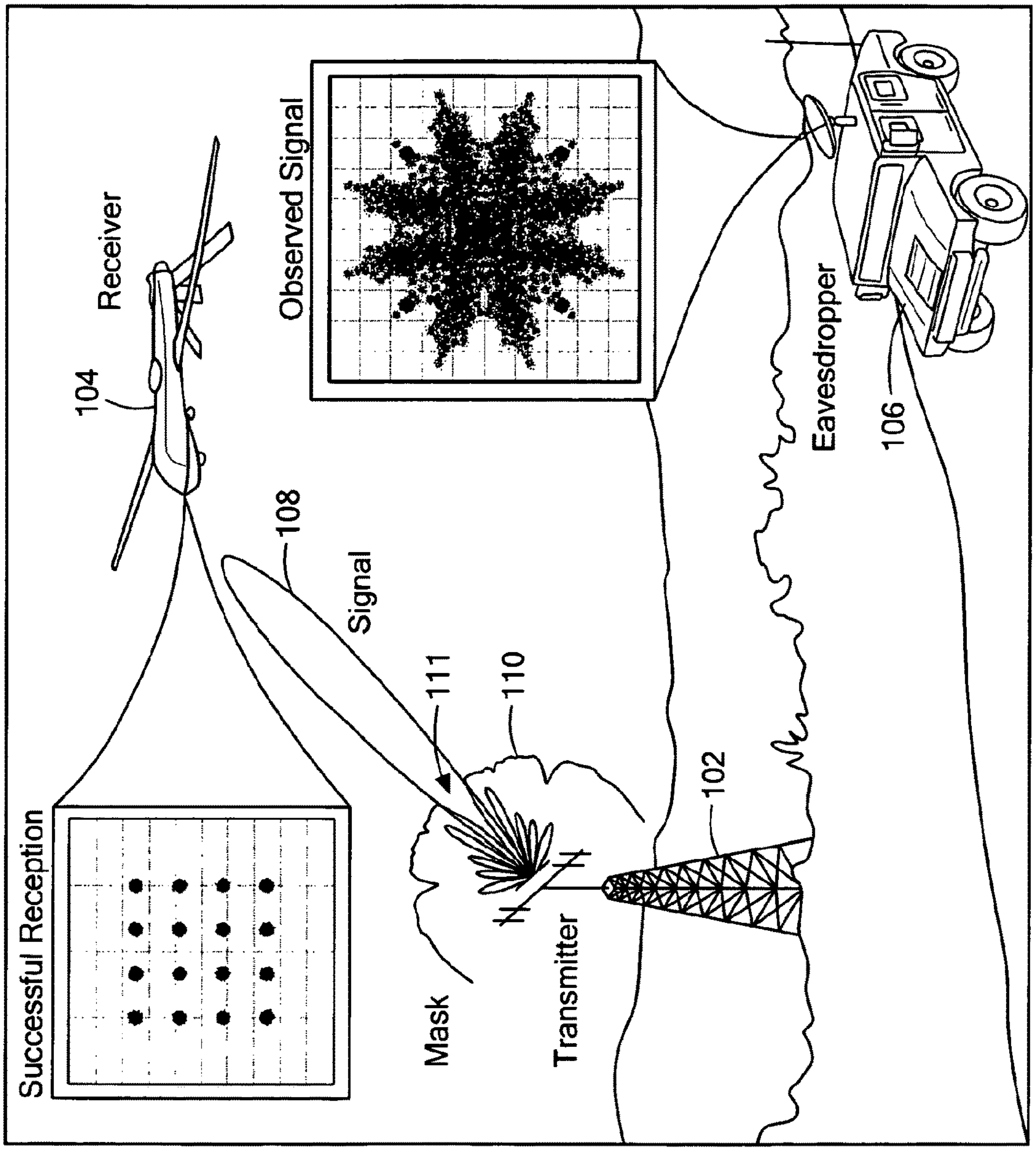
FIG. 1 is a diagrammatic view illustrating operation of a masking transmitter.

Referring to FIG. 1, an illustrative operational scenario includes a masking transmitter 102, an intended receiver 104, and one or more eavesdroppers 106. The masking transmitter 102 transmits information in the direction of the intended receiver 104 via a main beam 108, while transmitting a mask 110 in other directions to prevent eavesdroppers 106 from receiving the information. Thus, the transmitter 102 uses physical layer encryption (PLE) to securely communications with the intended receiver 104.

The masking transmitter 102 may correspond to a wireless transmit platform, such as a node in a cellular or Wi-Fi network, a base station, or a satellite transmit platform. The transmitter 102 is configured to wirelessly communicate with the intended receiver 104 by generating and transmitting the signals in free space. In some embodiments, the transmitter 102 generates a masking signal which is added to the communication signal such that the resulting mask 110 has a null 111 in the direction of intended receiver 104. An eavesdropper 106 receives a combination of the communication and masking signals (as illustrated by mask 110), with the masking signal dominant to degrade the information capacity of the eavesdropper channel.

In some embodiments, the masking transmitter 102 comprises a conventional radio frequency (RF) transmitter adapted to utilize PLE techniques disclosed herein. Advantageously, the PLE techniques disclosed herein can be added to transmitters of existing communication systems without having to modify the receivers (e.g., an RF receiver at intended receiver 104). Existing cellular and Wi-Fi transmitters make extensive use of powerful signal processing and multiple-antenna systems already and, thus, can be adapted to perform the relatively low-complexity PLE techniques disclosed herein. In addition, existing cellular and Wi-Fi systems have a relatively large quantity of deployed receivers, which would benefit from this technology without requiring upgrades.

The receiver 104 may correspond to a wireless receiver platform. In embodiments, the receiver 104 comprises a conventional radio receiver. The receiver may be located on a mobile platform, including but not limited to an aerial platform, a ground-based platform, or a water-based platform (e.g. an aircraft, a ground-based vehicle, or a watercraft). As mentioned, the PLE techniques disclosed herein can be used without requiring any changes to the intended receiver 104. To the intended receiver, the communication signal appears unchanged (as illustrated beam 108) whether the transmitter is a masking transmitter or a conventional transmitter. This has the benefit of allowing existing transmitters to be upgraded individually and for staged deployment.

In some embodiments, the masking transmitter 102 tracks the relative position of the intended receiver 104 and uses beam steering to direct the main beam 108 thereto. For example, masking transmitter 102 may include a phased array which provides adjustable phase relationships among the antenna elements to direct the main beam 108.

Figure 2:
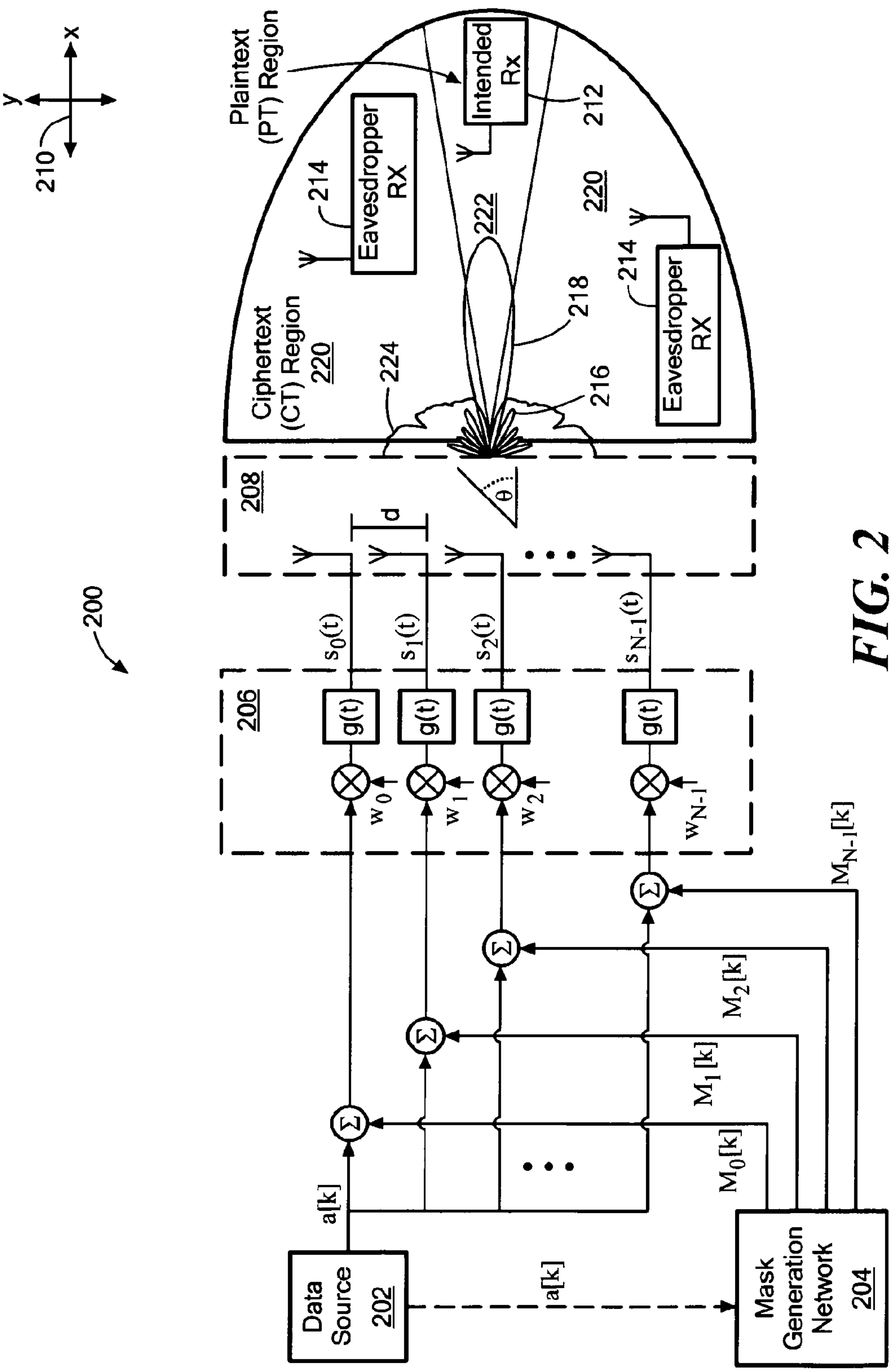
FIG. 2 is a block diagram of a masking transmitter architecture for use within the communications system.

Referring to FIG. 2, a masking transmitter architecture 200 can be used within a masking transmitter, such as masking transmitter 102 of FIG. 1. The illustrative architecture 200 includes a data source 202, a mask generation network 204, a pulse-shaping and beamforming network 206, and an antenna array 208. The antenna array 208 includes an arbitrary number (N) of antenna elements, which may be evenly spaced as shown. Those of ordinary skill in the art will appreciate after reading the disclosure provided herein that the antenna array 208 may be provided having even element spacing. In some embodiments, the antenna array 208 is provided as a phased array.

The data source 202 generates, or otherwise provides, a modulated data signal. The modulated data signal can be represented as a vector of complex-valued data symbols, where a[k] denotes the complex data symbol at time k. The mask generation network 204 is coupled to receive the modulated data signal and configured to generate a plurality of masking signals. The masking signals are selected (or "structured") based upon the data signal using techniques disclosed herein. The masking symbols can also be represented as a vector of symbols, where $M_n[k]$ denotes the symbol for the $n^{th}$ masking signal at time k. The modulated data signal is combined with the masking signals to generate a plurality of masked data signals. As shown in FIG. 2, the data signal may be summed with each of the masking signals on a symbol-by-symbol basis.

The pulse-shaping and beamforming network 206 receives the masked data signals and generates a plurality of transmit signals which can be transmitted into free space via antenna array 208. The number of generated masking signals and masked data signals may be equal to the number of transmit antennas (N).

In the embodiment shown, the network 206 applies a beamforming weight $w_n$ to each masked signal n, which is then filtered using a continuous-time band-liming pulse. In some embodiments, the filters, denoted g(t), are provided as square-root Nyquist filters with bandwidth 1/T, where T is a selected signaling interval. Thus, the signal transmitted on the $n^{th}$ of N antenna elements may be a continuous-time signal expressed as $$s_n(t)=\Sigma_{k=-\infty}^{\infty} w_n(a[k]+M_n[k])g(t-kT). \quad (3)$$

In general, the weights $w_n$ determine the boresight of the antenna array 208. In this example, the weights are selected to be $w_n=1$ so that the array boresight is directed along the x-axis 210 where an intended receiver 212 is located.

If the antenna elements are evenly spaced at a distance d wavelengths apart, the received signal at an angle θ off the x-axis can be expressed as $$r(t;\theta)=\gamma\Sigma_{n=0}^{N-1} s_n(t)e^{j2\pi d\cos\theta}+\varphi(t) \quad (4)$$

where γ is a constant path-loss component due to propagation and φ(t) is additive white Gaussian noise (AWGN) with a power spectral density $N_0/2$. From equations (3) and (4) it will be appreciated that the choice of the masking signal $M_n[k]$ can have a significant effect the signal fidelity of a receiver as a function of θ.

In various embodiments, the restriction $\Sigma_{n=0}^{N-1} M_n[k]=0$ is imposed such that the masking signals impart no interference on the intended receiver 212. A simple choice for the mask is to set $M_n[k]=0$ for all n and k which reduces the system to a traditional beamforming array. This method suffers from side-lobes 216 off the main beam 218 which are vulnerable to an eavesdropper 214 employing a high-gain antenna. Existing PLE techniques, such as Additive Artificial Noise (AAN), may improve upon traditional beamforming by selecting $M_n[k]$ to be AWGN such that the power level makes decoding off the beam difficult (or even impossible). The constraint $\Sigma_{n=0}^{N-1} M_n[k]=0$ must still be met to satisfy the cancellation requirement at the intended receiver and the standard deviation of the noise, $\sigma_M$ can be chosen to satisfy the security requirements. Note that this condition is a subset of the more general null-space formulation described in (2) in the Background section above. While this approach provides security, the transmitter efficiency is greatly diminished as the signal's peak-to-average power ratio (PAPR) increases significantly.

The mask generation network 204 generates masking signals using a technique based on the principles of outphasing amplification techniques and, more particularly, of linear amplification using non-linear components (LINC). LINC systems include a signal component separator which produces constant-envelope branch signals by combining the communication signal with a linearizing signal. Likewise, mask generation network 204 generates masking signals based upon the definition of an envelope correction factor. Given a complex-valued data signal a, a linearizing signal (also referred to herein as a "structured masking signal") can be computed as $$e[k]=\begin{cases} j\sqrt{\dfrac{R_{max}^2}{\|a[k]\|^2}-1}, & 0<\|a[k]\|<R_{max} \\ 0, & \text{otherwise} \end{cases} \quad (5)$$

and can be used to create two sub-components of the original signal, $$a^+[k]=a[k](1+e[k]) \quad (6)$$

$$a^-[k]=a[k](1-e[k]). \quad (7)$$

These sub-components have properties of note:

1. summing them together produces a scaled version of the original sample, viz $a^{+}[k]+a^{-}[k]=2a[k]$; and
2. $\|a^{+}[k]\|=\|a^{-}[k]\|=R_{max}$ provided that $\|a[k]\|\leq R_{max}$.

The first property provides the masking condition to prevent distortion for the intended receiver 212. The second property provides a constant amplitude signal, which reduces PAPR and thus reduces the required amplifier performance.

The $n^{th}$ masked data signal can be defined as:

$$M_n[k]=a[k]e[k]r_n[k] \tag{8}$$

where $r_n[k]$ is the $n^{th}$ element of mask coefficient vector, sometimes referred to as a "scrambling vector." In some embodiments, the mask coefficient vector is selected such that:

$$\{r_n[k]=\pm 1,\ \Sigma_{n=0}^{N-1} r_n[k]=0\forall k\} \tag{9}$$

The mask coefficients may be randomly generated on a per-symbol basis to randomly assign either $a^{+}[k]$ or $a^{-}[k]$ to each data signal value with the condition that there must always be an equal number of each. This maintains the condition $\Sigma_{n=0}^{N-1} M_n[k]=0\forall k$, guaranteeing that the masked signal cancels at the intended receiver 212.

It is appreciated that the masking technique described hereinabove is a generalization on conventional LINC, which can be expressed using the formulation above by setting N=2 and $r^T=[-1,1]$ for two branches with r fixed. Moreover, randomly generating the mask coefficients for each symbol has the same effect of generating a different distortion for each symbol as in Dynamic Directional Modulation (DM).

The transmitted signals can be seen to be a superposition of a standard beamformed signal with the noise-like vector (i.e., a mask). Based on the structure of the masking signals described hereinabove, the masking signals cancel at the intended receiver's 212 location. For a receiver away from the main lobe 218, this cancellation does not occur and so the signal is corrupted. This degrades an eavesdropper's 214 channel capacity and ensures a positive secrecy capacity so that the transmission can be protected from interception.

Using the techniques and structures described above, a transmitter can produce two distinct areas of reception: a ciphertext region 220 and a plaintext region 222. These two regions differ in the fact that within the plaintext region 222 the communication signal 218 dominates, while in the ciphertext region 220 the masking signal 224 dominates. In terms of system security, the plaintext region 212 can be treated as though it is an area denied to the adversary; that is, the adversary is limited to only placing eavesdroppers 214 in the ciphertext region 220. It is noted that while the terms "ciphertext" and "plaintext" are usually used to denote cryptographic solutions, here they are used to denote whether or not a communication signal is obfuscated by the masking signal.

It will be appreciated that the PLE techniques described herein can be used to make it difficult (or even impossible) for an eavesdropper 214 within a ciphertext region 220 to recover a communications signal, even if the eavesdropper is a highly capable adversary (e.g., even if an eavesdropper has perfect knowledge of the transmitter and waveform, including knowledge of the modulation scheme, the encoding, the frame structure and any other transmitter-specific parameters required, can estimate the correct time and phase offsets to recover the symbols, and has better gain than the intended receiver 212).

It should be understood that the concepts, and structures, and techniques sought to be protected herein are not limited to the specific masking signal formulations described hereinabove and that other formulations may be used. For example, quad LINC, which is described by Hegazi et al. ("Improved LNC power transmission using a quadrature outphasing technique," Microwave Symposium Digest, 2005 IEEE MTT-S International, 12-17 Jun. 2005) is similar to the standard LINC formulation previously discussed except that it is performed separately on the I and Q components of the data signal. This results in four different branch signals which would then be randomized among the array elements.

Another possible choice of masking signal is a multi-level LINC formulation, such as the multi-level LINC formulation described within the aforementioned Hegazi et al. paper. The basic concept of multi-level LINC is to form branch signals with multiple discrete amplitude levels, as opposed to a single level for standard LINC.

In addition, multiple masking signal techniques may be implemented within a single masking transmitter. For example, both standard LINC and quad LNC can be implemented in parallel and share some resources. Such a transmitter can switch between standard and quad for different modulation types. The transmitter could also interleave the two masking signals at the symbol rate, which would increase the number of combinations for an improvement in the secrecy capacity.

Figure 3:
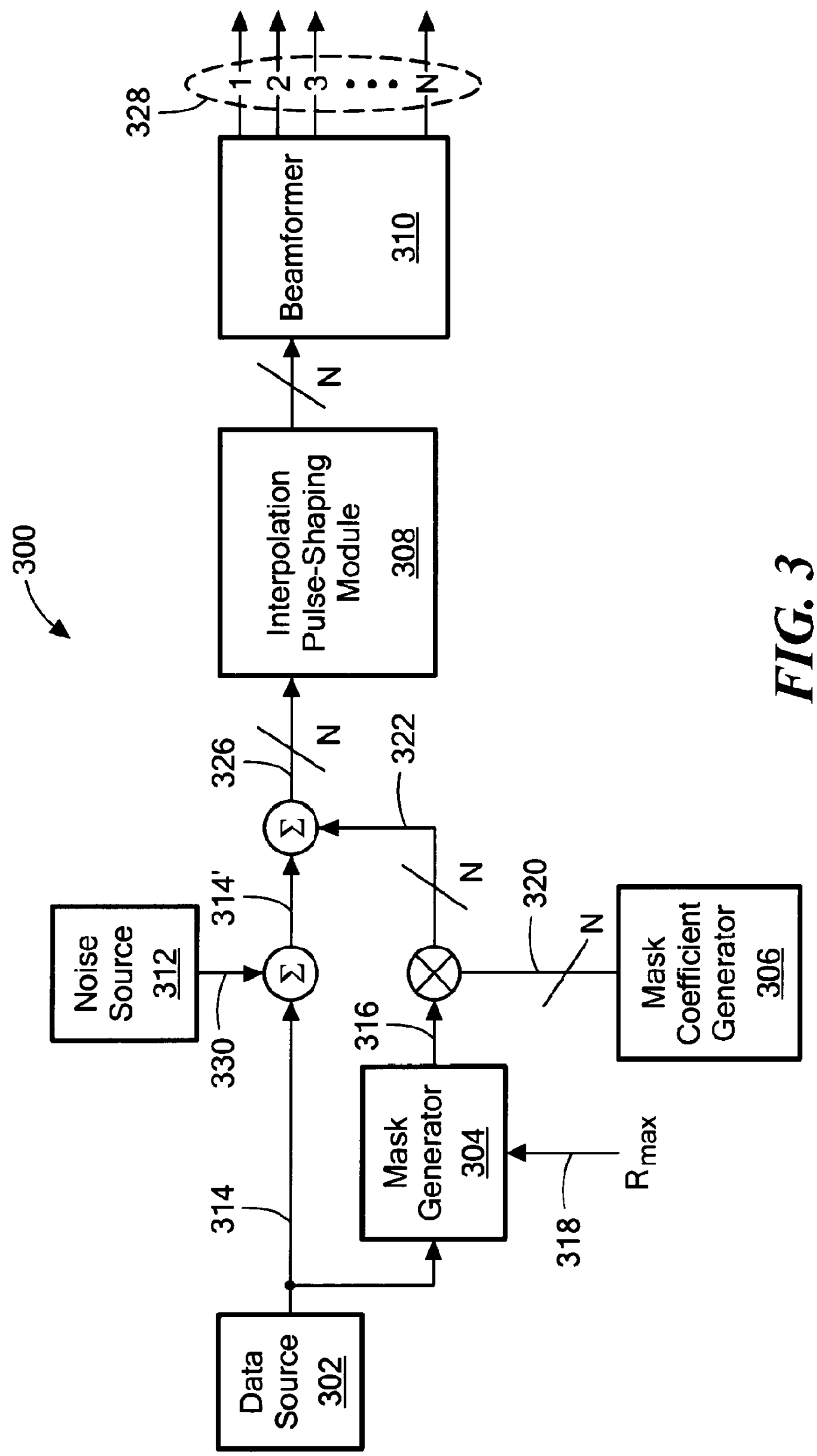
FIG. 3 is a block diagram of an illustrative masking transmitter for use within a communications system.
Figure 4A:
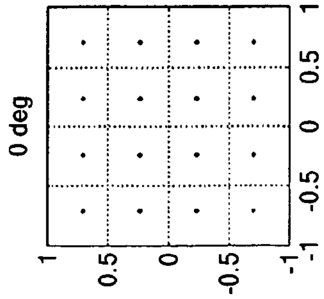
FIGS. 4A-4J, 5A, and 5B are constellation plots illustrating the security provided by the techniques and structures disclosed herein.
Figure 4B:
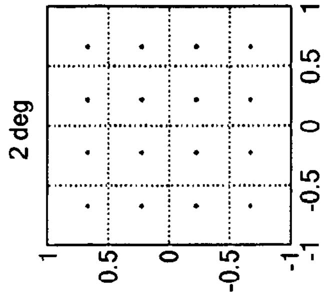
Figure 4C:
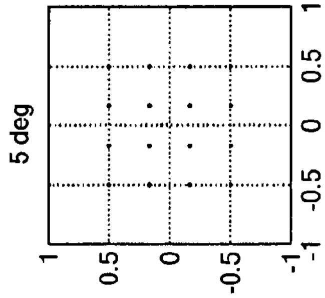
Figure 4D:
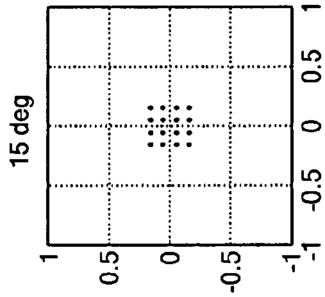
Figure 4E:
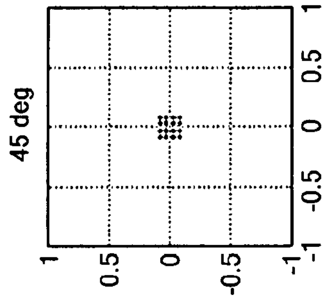
Figure 4F:
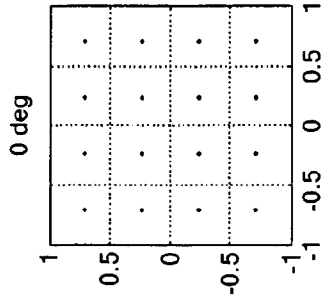
Figure 4G:
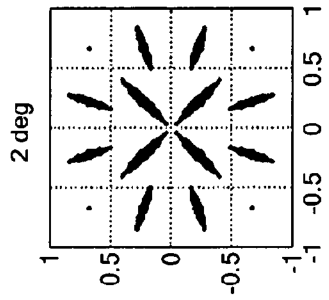
Figure 4H:
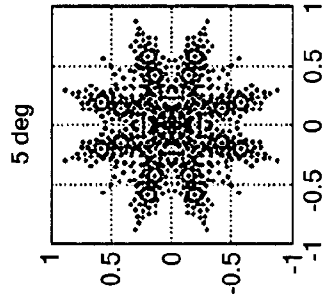
Figure 4I:
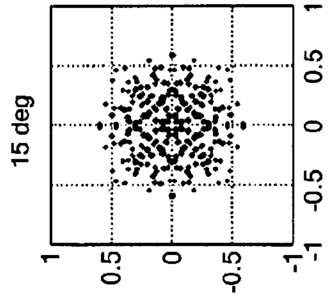
Figure 4J:
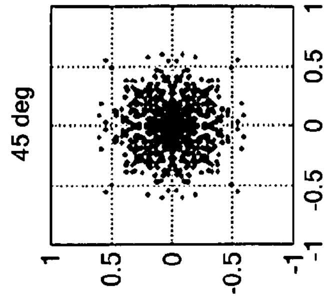

Referring to FIG. 3, an illustrative masking transmitter 300 includes a data source 302, a mask generator 304, a mask coefficient generator 306, an interpolation/pulse-shaping module 308, and a beamformer 310. In some embodiments, the transmitter 300 further includes a noise source 312. The components 302-312 may be coupled together as shown, or in any other suitable configuration. Each connection may be provided as a hardware-based connection, a software-based connection, or a connection provided from a combination of both hardware and software.

It should be appreciated that masking transmitter 300 generally conforms to the architecture 200 and, thus, the concepts and techniques described above in conjunction with FIG. 2 may apply herein. In particular, data source 302 may correspond to data source 202; mask generator 304 and mask coefficient generator 306 may collectively correspond to mask generation network 204; and interpolation/pulse-shaping module 308 and beamfoimer 310 may collectively correspond to pulse-shaping and beamforming network 206.

The data source 302 generates (or otherwise provides) modulated data signal 314. For simplicity of explanation, signal paths and respective signals carried on those signal paths are shown using common reference designators in FIG. 2. For example, the modulated data signal may be carried on a respective signal path 314, as shown.

The mask generator 304 is coupled to receive the modulated data signal 314 and configured to generate a structured masking signal 316 based upon the data signal 314. In some embodiments, the mask generator 304 also receives a mask power level 318, used to control the ratio between signal and mask power. To generate the structured masking signal 316, the mask generator 304 may utilize an implementation of equation (5), where $R_{max}$ corresponds to mask power level 318 and a[k] corresponds to a complex data symbol associated with data signal 314 at time k. In some embodiments, the square-root function of equation (5) is tabulated and stored within the transmitter 300 to reduce computation costs.

The mask coefficient generator 306 generates a plurality of mask coefficients 320, which are combined with structured masking symbol 316 to generate a plurality of masking signals 322. As discussed about in conjunction with FIG. 2, a vector of mask coefficients (or "scrambling vector") can be randomly generated on a per-symbol basis subject to certain constraints. For example, as shown in formula (9), the mask coefficients should sum to zero so that cancellation that cancellation occurs at an intended receiver. The mask coefficient generator 306 can be synchronous with the data source 302, but this is not necessarily required. In some embodiments, the mask coefficient generator 306 generates a vector of randomly selected values using a pseudo-random number generator (PRNG) or other suitable device.

In particular embodiments, a set of possible mask coefficient vectors may be tabulated and stored within the transmitter 300 to reduce computational costs. However, it may be impractical to pre-compute and/or store all such possible vectors. Thus, the mask coefficient generator 306 may choose to tabulate a subset of all possible mask coefficient vectors; choosing the population of this table can provide an optimization for various characteristics. For example, a subset of vectors can be chosen to provide a null in the masking signal at a particular angular location or to modulate the width of the null at the intended receiver. The subset chosen may be static or could be updated as the environment changes. So long as the size of the subset is not too small, security will not be significantly degraded. Alternatively, because all possible mask coefficient vectors are permutations of each other, the mask coefficient generator 306 may be initialized with a random vector and then perform a random shuffling routine, such as the Fisher-Yates algorithm, to generate a new random permutation for each update.

In some embodiments, the masking transmitter 300 includes a noise source 312. As discussed below in conjunction with FIGS. 4 and 5, introducing noise into the data signal can improve security. As shown, the noise source 312 generates a noise signal 330 which is added to the modulated data signal 314 to generate a "noisy" data signal 314'. The noise source 312 may use a PRNG, or other suitable device, with the amplitude fixed or variable for different modulation types. The noise source 312 may generate AWGN or any other suitable type of noise. As shown in FIG. 3, the structured signal 316 generated by mask generator 304 may be based upon the data signal 314 without noise added. In other embodiments, the noise source 312 is coupled such that the structured masking signal is based upon the "noisy" data signal. In other words, noise 330 can be added either "before" or "after" the mask is generated. It should be appreciated that, if the processing described herein is performed digitally, truncation noise due to the finite number of bits can act as an additive noise source and thus, an explicitly noise source 312 may be unnecessary to provide the desired security.

The masking signals 322 are combined with the modulated data signal 314 (or with the noisy data signal 314') to generate a plurality of masked data signals 326. The ratio between the power of data signal 314 and mask signal 322 may be varied by changing the mask power 318 ($R_{max}$). The mask power 318 may be fixed or may vary, typically on a long time-scale. It is appreciated that diverting additional transmit power to the masking signal will degrade the eavesdropper's ability to demodulate the transmitted signal, but may also reduce the intended receiver's channel capacity.

The interpolation/pulse-shaping module 308 and beamformer 310 are coupled to receive the masked data signals 326 and configured to generate a plurality of transmit signals 328, here N transmit signals. A conventional interpolation/pulse-shaping module 308 and/or beamformer 310 may be used. In a typical implementation, symbols are up-sampled to the required digital-to-analog converter (DAC) sample rate, which may be many times the symbol rate, and filtered by a pulse-shaping filter such as a root-raised cosine. In many applications this filter will sharply limit the spectrum of the transmitted signal for spectral efficiency; this does not impact the security of the masking transmitter 300 but will re-introduce some amplitude variation into the output signal. Some applications may omit the pulse-shaping filter or replace it with a less-sharp low-pass filter. The beamformer 310 applies appropriate phase weights to the transmit elements to steer the beam in the desired direction. It should be noted that, although the beamformer 310 is shown immediately before the antenna elements here, the implementation is equivalent if phase weights are applied to the data signal 314 and masking signals 322 separately.

Each transmit signal 328 may be coupled to a respective transmit antenna (not shown) for transmission into free space. In some embodiments, the transmit antennas are provided as an antenna array (e.g., a phased array), with each transmit signal 328 coupled to a respective one of N array antenna elements. In some embodiments, the number of antenna elements N is even.

In particular embodiments, one or more of the components 302-312 are resident within a digital signal processor (DSP) of the transmitter 300. A data signal may be generated elsewhere in the transmitter, supplied in digital form, and modulated to generate modulated signal 314. The transmit signals 328 can be supplied digitally to individual antenna elements (not shown). To retrofit an existing system, the transmitter 300 may include a analog-to-digital converter to convert an analog data signal to digital data signal 314 and/or may include digital-to-analog converters to convert digital transmit signals 328 to analog transmit signals.

FIGS. 4A-4J, 5A, and 5B show a series of constellation plots (or, more simply, "constellations") wherein x-axes correspond to in-phase amplitude of a signal and the y-axes correspond to the quadrature amplitude of a signal.

FIGS. 4A-4J show a series of constellation plots illustrating the security provided by a masking transmitter, such as masking transmitter 300 of FIG. 3. The top row of plots, corresponding to FIGS. 4A, 4B, 4C, 4D, and 4E, illustrate 16-QAM constellations produced by a conventional transmitter as seen by a receiver at 0, 2, 5, 15, and 45 degrees off boresight, respectively. The bottom row of plots, corresponding to FIGS. 4F, 4G, 4H, 4I, and 4J, illustrate 16-QAM constellations produced by a masking transmitter (e.g., masking transmitter 300 of FIG. 3) as seen by a receiver at 0, 2, 5, 15, and 45 degrees off boresight, respectively.

The security of a masking transmitter 300 may be linked to the number of transmit antennas N. A noise-like masking signal 322 has a discrete set of M possible values based on the two available signs and the number of possible combinations of the mask coefficients 320. For example, if N=8, M=70. For an eavesdropper, each transmitted symbol will take on M discrete values in the corrupted constellation. This is referred to as re-mapping, and results in a 16-QAM constellation being re-mapped into a relatively large number (e.g., 1120) of different points. This re-mapping process is a function of the eavesdropper channel, such that two eavesdroppers in different locations will see different constellations. Assuming that the masking signal is synchronous to the data symbols, each symbol will appear at the eavesdropper in one of the M possible locations.

It can be seen from FIGS. 4F-4J that an eavesdropper with a standard 16-QAM receiver will suffer an increasingly high error rate as it moves away from boresight (i.e., FIG. 4A) towards increasing off-angle positions (e.g., FIGS. 4G-4J). However, because the masking signal is partially a function of the data signal, a security analysis must consider whether there is still information content useful to the eavesdropper.

If the eavesdropper has knowledge of the masking technique and the channel, it can determine the re-mapped constellation and attempt to recover the original transmitted symbols. There are also blind channel estimation and multiuser detection techniques that may allow estimation of the re-mapped constellation from the received signal at the eavesdropper. Thus, it is understood that an optimum eavesdropper could exist which would have perfect knowledge of the constellation re-mapping process along with other knowledge about the modulation and waveform structure being used.

Without any noise, knowledge of the re-mapped constellation will allow the eavesdropper to recover the original symbols and drive the secrecy capacity towards zero. However, the structure of the re-mapped constellation puts even the optimum eavesdropper at a disadvantage relative to the intended receiver. The re-mapped constellation has many more points than the original (by a factor of M, which may be very large) and so the average distance between points will be much smaller than in the transmitted constellation. Further, as seen in FIGS. 4F-4J, the distances between points are not equal and some are relatively close together. In order to recover the transmitted data without errors, the signal-to-noise ratio (SNR) must be very high, based upon the minimum point-to-point distance.

As discussed above, for the purpose of security analysis, it is assumed that an eavesdropper can achieve arbitrarily high SNR. This may be a result of the eavesdropper has a relatively sensitive receiver (i.e., having a relatively high antenna gain and/or low noise temperature to achieve a relatively high gain-over-temperature figure-of-merit), being much closer than the intended receiver, or both. To mitigate the ability of such an eavesdropper to recover the original modulation under high-SNR conditions, a relatively small amount of noise (e.g., Gaussian white noise) can be added to the data signal, e.g., using noise source 312 in FIG. 3. This noise may be randomly added independently to each transmit signal so it appears uniformly to all receivers, including the intended receiver. The variance of the noise may be chosen so that the resulting SNR is well above what the intended receiver requires, but below the SNR required to recover the re-mapped constellation. In some embodiments, the variance is chosen to set the added noise point approximately twenty (20) to thirty (30) dB below the signal power, and may depend on the modulation being used.

Figure 5A:
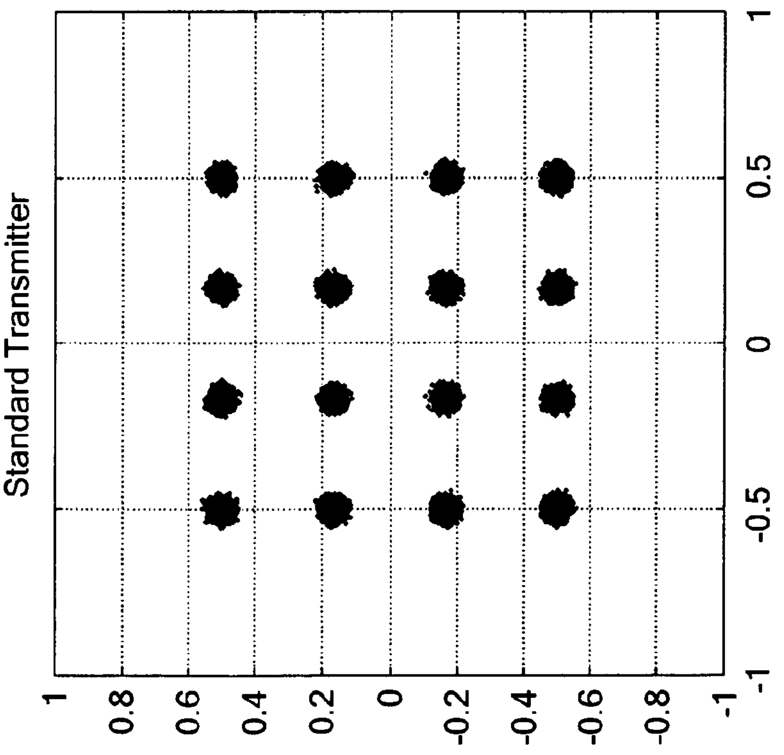
Figure 5B:
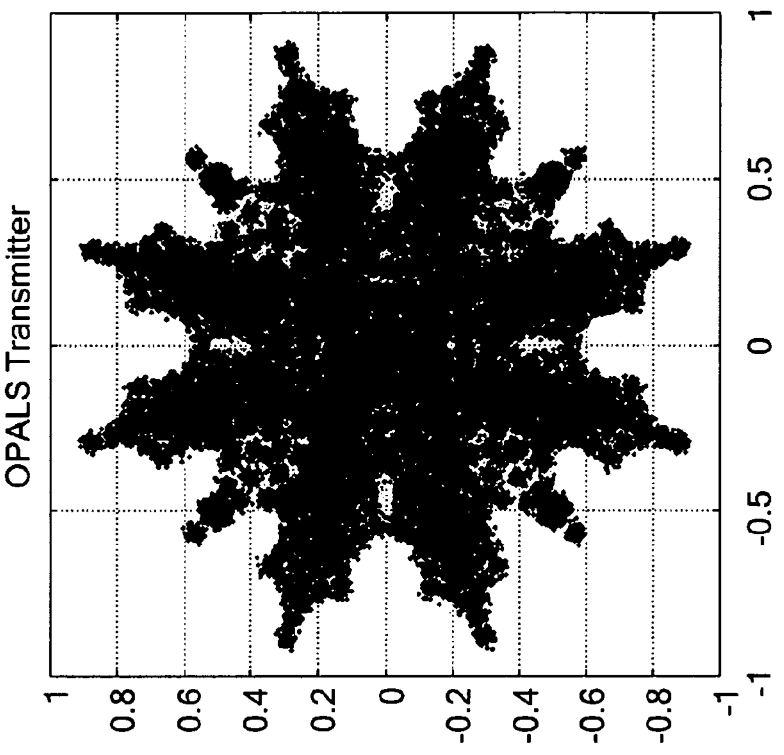

FIGS. 5A and 5B show a standard constellation (i.e., a constellation produced by a conventional transmitter) and a re-mapped constellation (i.e., a constellation produced by masking transmitter 300), respectively, in the presence of modest noise. In this example, the noise represents an SNR of about twenty eight (28) dB, which from FIG. 5A can be seen to be easily high enough for essentially error-free reception of 16-QAM. FIG. 5B shows what an eavesdropper at 5 degrees offset would receive. Even with knowledge of the re-mapping, this eavesdropper would suffer a high error rate because many of the points are "smeared" together. This effect is known as equivocation and illustrates the notion of information-theoretic security in that there is not enough information present in the signal even when an adversary (e.g., an eavesdropper) knows the technique being used. Other techniques may also be used individually or in conjunction to increase equivocation to an eavesdropper. Examples include but are not limited to varying $R_{max}$ over time, varying the rate at which the scrambling vector is updated, and switching between different masking signal designs over time.

Figure 6:
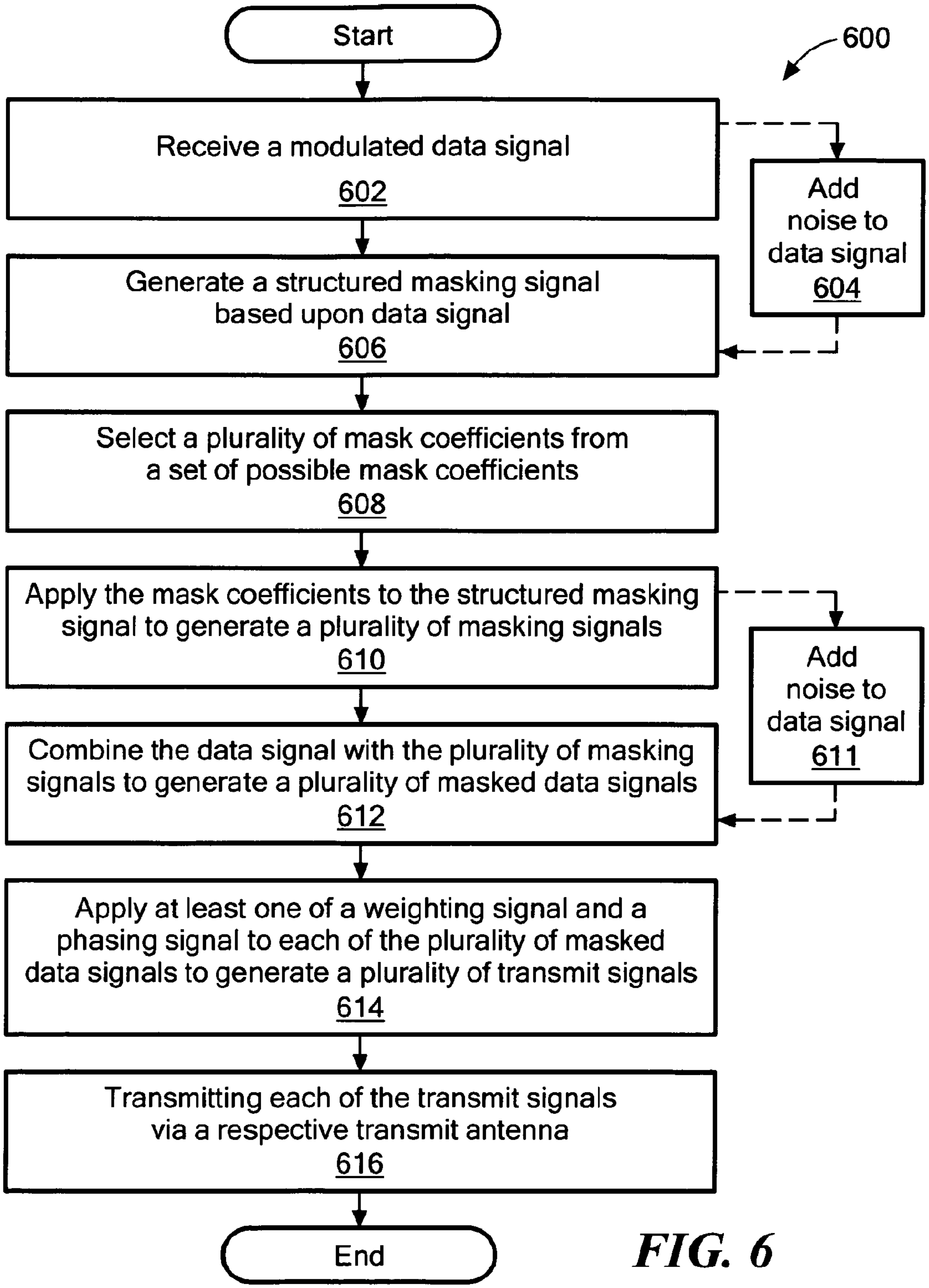
FIG. 6 is a flow diagram of an illustrative method for use within a masking transmitter.

FIG. 6 is a flow diagram showing illustrative processing that can be provided within a masking transmitter, such as masking transmitter 300 of FIG. 3. Rectangular elements (typified by element 602), herein denoted "processing blocks," represent computer software instructions or groups of instructions. Alternatively, the processing blocks may represent steps performed by functionally equivalent circuits such as a digital signal processor circuit or an application specific integrated circuit (ASIC). The flow diagram does not depict the syntax of any particular programming language. Rather, the flow diagram illustrates functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

Referring to FIG. 6, a method 600, begins at block 602, where a modulated data signal is received, such as from data source 302. In some embodiments, at block 604, noise is added to the data signal. As discussed above, such noise can be added explicitly via a noise source 312 and/or implicitly as a result of digital signal processing (e.g., truncation noise). In other embodiments, noise is added to the data signal "after" a masking signal is generated, as illustrated with block 611.

At block 606, a structured masking signal is generated based upon the data signal (or "noisy" data signal). At block 608, a plurality of mask coefficients are selected from a set of possible mask coefficients and, at block 610, the mask coefficients are applied to the structured masking signal to generate a plurality of masking signals. Illustrative techniques for generating a structured mask signal, selecting mask coefficients, and generating masking signals are described above in conjunction with FIGS. 2 and 3.

At block 612, the data signal (or "noisy" data signal) is combined (e.g., summed) with the masking signals to generate a plurality of masked data signals. At block 614, a plurality of transmit signals are generated by applying at least one of a weighting signal and a phasing signal to each of the masked data signals. At block 616, each of the transmit signals may be transmitted via a respective transmit antenna (e.g., an element of an antenna array). In some embodiments, blocks 614 and 616 are performed by a phased array.

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

The invention claimed is:

1. In a transmit system, a method for generating physical layer encrypted communication, the method comprising:

receiving a modulated data signal;

generating, a structured masking signal based upon the modulated data signal;

selecting a plurality of mask coefficients, each of the plurality of mask coefficients selected from a set of possible mask coefficients;

applying the mask coefficients to the structured masking signal to generate a plurality of masking signals;

combining the modulated data signal with the plurality of masking signals to generate a plurality of masked data signals; and applying at least one of a weighting signal and a phasing signal to each of the plurality of masked data signals to generate a plurality of transmit signals, the transmit signals having a null in a predetermined direction wherein generating a structured masking signal based upon the modulated data signal comprises selecting a point on a circle having predetermined radius based upon the data signal.

2. The method of claim 1 further comprising applying noise to the modulated data signal to increase a bit error rate (BER) associated with the transmit signals.

3. The method of claim 1 further comprising receiving a mask power level ($R_{max}$), wherein the radius of the circle is determined based upon the mask power level.

4. The method of claim 3 wherein generating a structured masking signal based upon the modulated data signal (a[k]) comprises computing $$\sqrt{\frac{R_{max}^2}{\|a[k]\|^2} - 1}.$$

5. The method of claim 4 further comprising generating a table of solutions to $$j\sqrt{\frac{R_{max}^2}{\|a[k]\|^2} - 1}$$

for various values a[k], wherein generating a structured masking signal based upon the modulated data signal comprises selecting a value from the table of solutions.

6. The method of claim 1 wherein selecting a plurality of mask coefficients comprises selecting a plurality of random numbers.

7. The method of claim 1 wherein selecting a plurality of mask coefficients comprises selecting a plurality of mask coefficients that sum to zero.

8. In a transmit system, a method for generating an physical layer encrypted communication, comprising:

receiving a modulated data signal;

generating a structured masking signal based upon the modulated data signal;

selecting a plurality of mask coefficients, each of the plurality of mask coefficients selected from a set of possible mask coefficients;

applying the mask coefficients to the structured masking signal to generate a plurality of masking signals;

combining the modulated data signal with the plurality of masking signals to generate a plurality of masked data signals; and applying at least one of a weighting signal and a phasing signal to each of the plurality of masked data signals to generate a plurality of transmit signals, the transmit signals having a null in a predetermined direction and further comprising generating a plurality of possible mask coefficient vectors, wherein selecting a plurality of mask coefficients comprises randomly selecting a mask effective vector from the plurality of possible mask coefficient vectors.

9. In a transmit system, a method for generating an physical layer encrypted communication, comprising:

receiving a modulated data signal;

generating a structured masking signal based upon the modulated data signal;

selecting a plurality of mask coefficients, each of the plurality of mask coefficients selected from a set of possible mask coefficients;

applying the mask coefficients to the structured masking signal to generate a plurality of masking signals;

combining the modulated data signal with the plurality of masking signals to generate a plurality of masked data signals; and applying at least one of a weighting signal and a phasing signal to each of the plurality of masked data signals to generate a plurality of transmit signals, the transmit signals having a null in a predetermined direction wherein applying the mask coefficients to the structured masking signal to generate a plurality of masking signals comprises modulating the structured masking signal by ones of the plurality of mask coefficients.

10. In a transmit system, a method for generating an physical layer encrypted communication, comprising:

receiving a modulated data signal;

generating a structured masking signal based upon the modulated data signal;

selecting a plurality of mask coefficients, each of the plurality of mask coefficients selected from a set of possible mask coefficients;

applying the mask coefficients to the structured masking signal to generate a plurality of masking signals;

combining the modulated data signal with the plurality of masking signals to generate a plurality of masked data signals; and applying at least one of a weighting signal and a phasing signal to each of the plurality of masked data signals to generate a plurality of transmit signals, the transmit signals having a null in a predetermined direction wherein combining the modulated data signal with the plurality of masking signals to generate a plurality of masked data signals comprises summing the modulated data signal with ones of the plurality of masking signals.

11. The method of claim 1 further comprising transmitting each of the transmit signals via a respective transmit antenna.

12. The method of claim 11 wherein transmitting each of the transmit signals comprises transmitting via a phased array.

13. The system of claim 1 wherein the processor is further configured to apply noise to the modulated data signal to increase a bit error rate (BER) associated with the transmit signals.

14. A system for physical layer encrypted communication, the system comprising:

a data source;

a plurality of transmit antennas; and a processor coupled to the input source and the transmit antennas, the processor configured to:

receive a modulated data signal from the data source;

generate a structured masking signal based upon the modulated data signal;

select a plurality of mask coefficients, each of the plurality of mask coefficients selected from a set of possible mask coefficients;

apply the mask coefficients to the structured masking signal to generate a plurality of masking signals;

combine the modulated data signal with the masking signals to generate a plurality of masked data signals;

apply at least one of a weighting signal and a phasing signal to each of the plurality of masked data signals to generate a plurality of transmit signals, the plurality transmit signals having a null in a predetermined direction; and transmit each of the plurality of transmit signals via a corresponding one of the plurality of transmit antennas wherein the processor is further configured to generate a structured masking signal by selecting a point on a circle having predetermined radius.

15. The system of claim 14 wherein the processor is configured to select a plurality of mask coefficients that sum to zero.

16. The system of claim 14 wherein the transmit antennas are provided within a phased array.

17. The method of claim 8 further comprising applying noise to the modulated data signal to increase a bit error rate (BER) associated with the transmit signals.

18. The method of claim 8 wherein generating a structured masking signal based upon the modulated data signal (a[k]) comprises computing $$\sqrt{\frac{R_{max}^2}{\|a[k]\|^2}-1}.$$

19. The method of claim 18 further comprising generating a table of solutions to $$j\sqrt{\frac{R_{max}^2}{\|a[k]\|^2}-1}$$

for various values a[k] and wherein generating a structured masking signal based upon the modulated data signal comprises selecting a value from the table of solutions.

20. The method of claim 8 wherein selecting a plurality of mask coefficients comprises selecting a plurality of random numbers.

21. The method of claim 8 wherein selecting a plurality of mask coefficients comprises selecting a plurality of mask coefficients that sum to zero.

22. The method of claim 9 further comprising applying noise to the modulated data signal to increase a bit error rate (BER) associated with the transmit signals.

23. The method of claim 9 wherein generating a structured masking signal based upon the modulated data signal (a[k]) comprises computing $$\sqrt{\frac{R_{max}^2}{\|a[k]\|^2}-1}.$$

24. The method of claim 23 further comprising generating a table of solutions to $$j\sqrt{\frac{R_{max}^2}{\|a[k]\|^2}-1}$$

for various values a[k] and wherein generating a structured masking signal based upon the modulated data signal comprises selecting a value from the table of solutions.

25. The method of claim 9 wherein selecting a plurality of mask coefficients comprises selecting a plurality of random numbers.

26. The method of claim 9 wherein selecting a plurality of mask coefficients comprises selecting a plurality of mask coefficients that sum to zero.

27. The method of claim 10 further comprising applying noise to the modulated data signal to increase a bit error rate (BER) associated with the transmit signals.

28. The method of claim 10 wherein generating a structured masking signal based upon the modulated data signal (a[k]) comprises computing $$\sqrt{\frac{R_{max}^2}{\|a[k]\|^2}-1}.$$

29. The method of claim 28 further comprising generating a table of solutions to $$j\sqrt{\frac{R_{max}^2}{\|a[k]\|^2}-1}$$

for various values a[k] and wherein generating a structured masking signal based upon the modulated data signal comprises selecting a value from the table of solutions.

30. The method of claim 10 wherein selecting a plurality of mask coefficients comprises selecting a plurality of random numbers.

31. The method of claim 10 wherein selecting a plurality of mask coefficients comprises selecting a plurality of mask coefficients that sum to zero.

* * * * *